Figure 7:
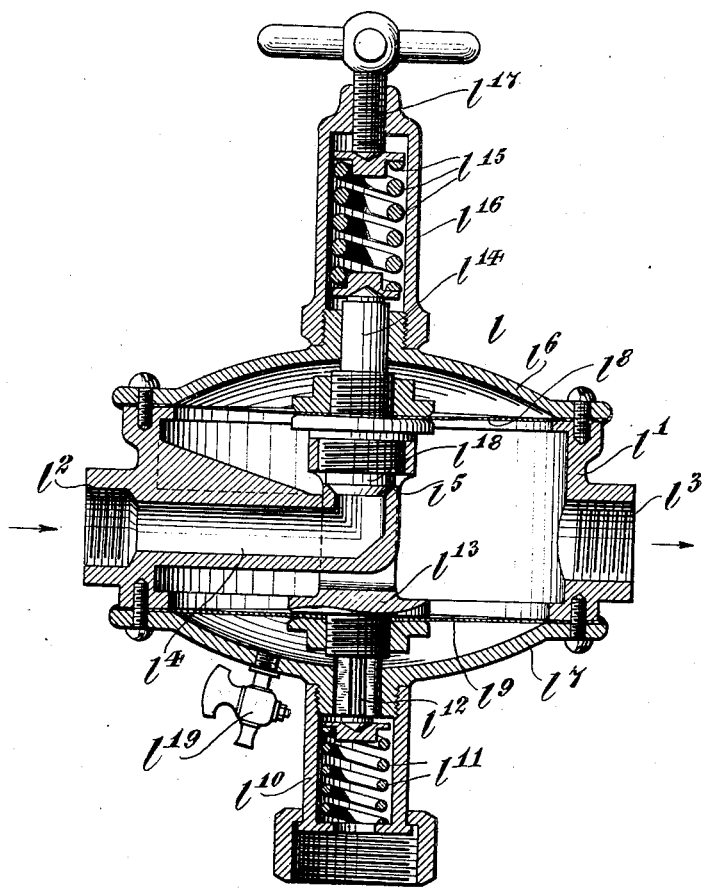

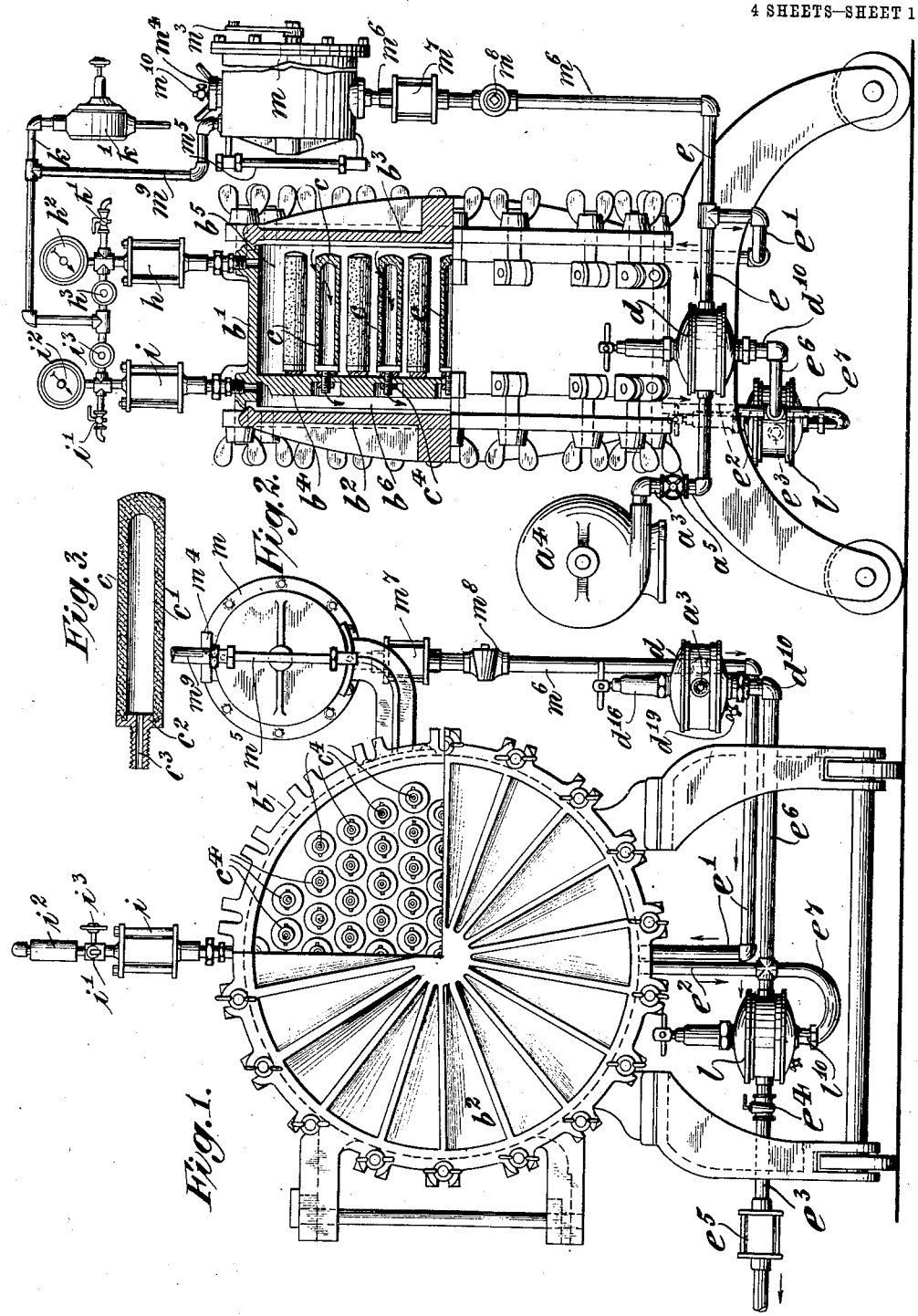
E. ZAHM.
FILTER.
APPLICATION FILED MAR. 22, 1911.
1,040,090.
Patented Oct. 1, 1912.
4 SHEETS—SHEET 1.

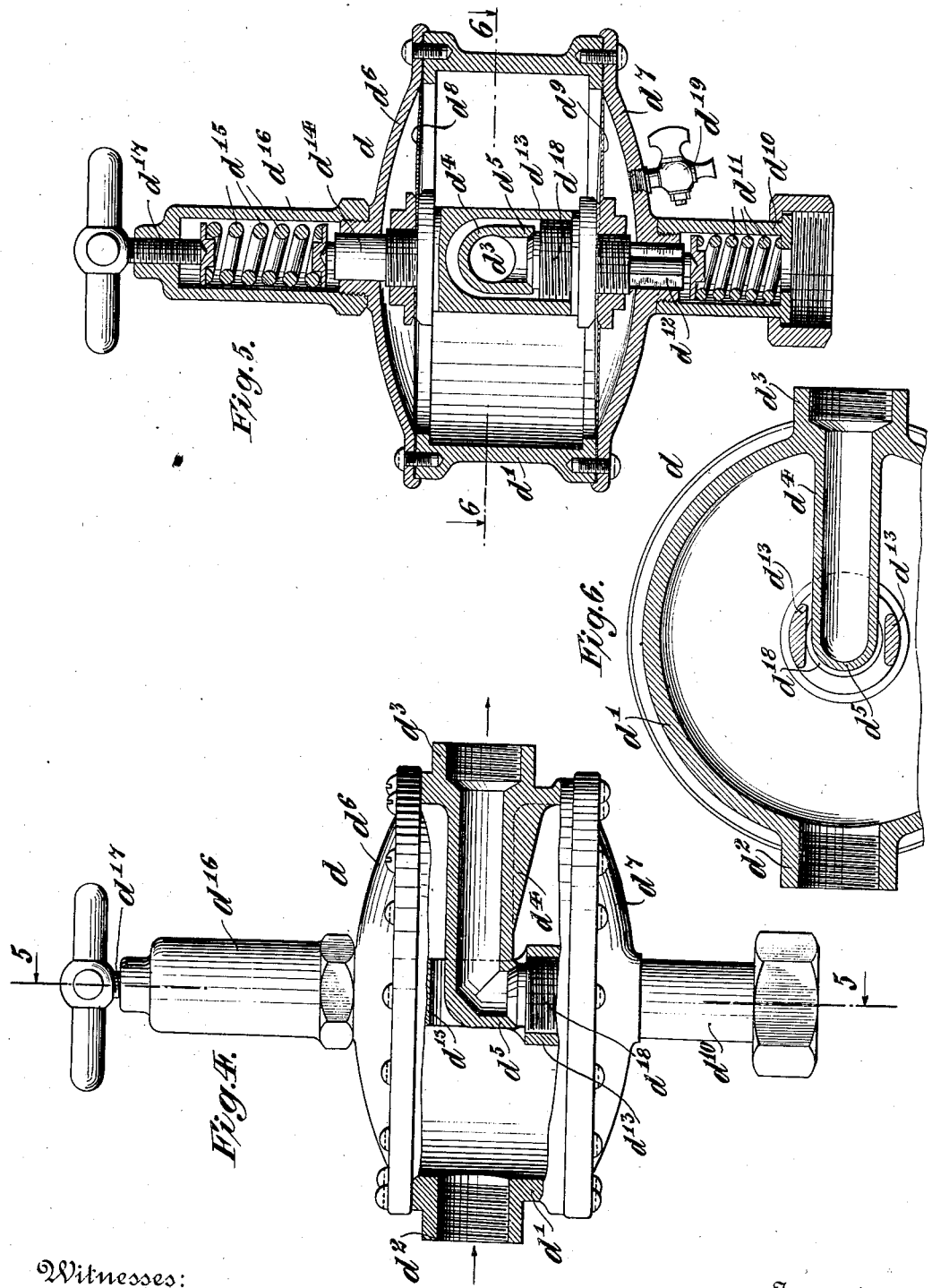

E. ZAHM.
FILTER.
APPLICATION FILED MAR. 22, 1911.

1,040,090.

Patented Oct. 1, 1912.
4 SHEETS—SHEET 3.

E. ZAHM.
FILTER.
APPLICATION FILED MAR. 22, 1911.
1,040,090.
Patented Oct. 1, 1912.
4 SHEETS—SHEET 4.
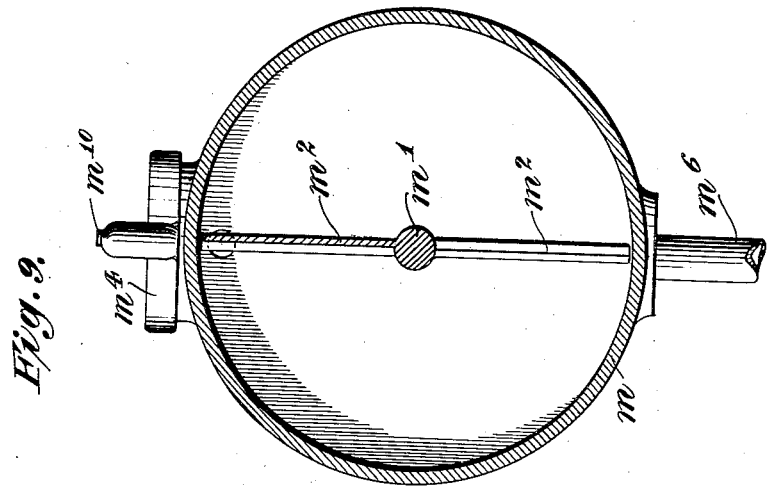
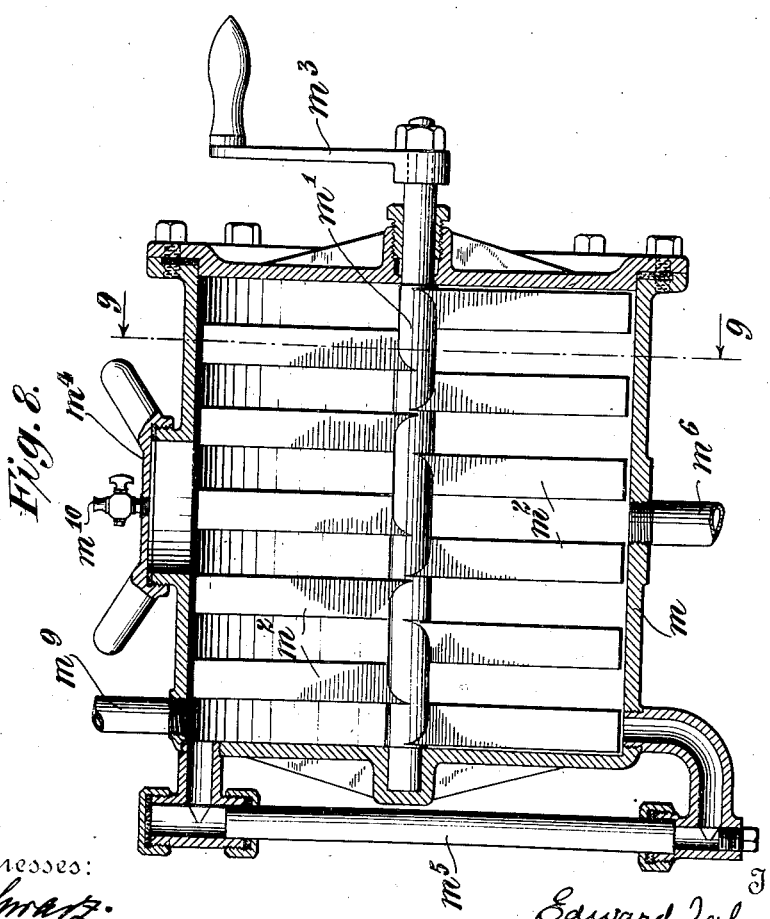
Witnesses:
Inventor
Edward Zahm
By his Attorneys
Redding, Greeley & Austin

UNITED STATES PATENT OFFICE.

EDWARD ZAHM, OF BUFFALO, NEW YORK, ASSIGNOR TO ZAHM MANUFACTURING COMPANY, OF BUFFALO, NEW YORK, A CORPORATION OF NEW YORK.

FILTER.

1,040,090.  Specification of Letters Patent.  Patented Oct. 1, 1912.

Application filed March 22, 1911. Serial No. 616,231.

*To all whom it may concern:*

Be it known that I, EDWARD ZAHM, a citizen of the United States, residing in the city of Buffalo, in the State of New York, have invented certain new and useful Improvements in Filters, of which the following is a specification, reference being had to the accompanying drawings, forming a part hereof.

This invention has for its object the production of a filter which can be used successfully and satisfactorily for the filtration to sterility of beer, that is, for the complete removal of the yeast cells and other organisms which remain in the beer after ordinary filtration through a pulp filter and must be destroyed by pasteurization.

The invention will be more fully explained hereinafter with reference to the accompanying drawings in which it is illustrated as embodied in a convenient and practical form and in which—

Figure 1 is a view of the improved filter in side elevation, a portion of the proximate head being removed to show details of construction. Fig. 2 is an edge view of the filter with the upper part in section. Fig. 3 is a detail view in section, on a larger scale, of one of the filter cores. Fig. 4 is a view partly in elevation and partly in vertical section of one of the regulators shown in Figs. 1 and 2, but on a larger scale. Fig. 5 is a vertical section on a plane at right angles to that of Fig. 4, the plane of section being indicated by the broken line 5—5 of Fig. 4. Fig. 6 is a partial view in horizontal section on the plane indicated by the line 6—6 of Fig. 5. Fig. 7 is a view in vertical section of the other of the two regulators shown in Figs. 1 and 2. Figs. 8 and 9 are detail views in section of the mixer shown in Figs. 1 and 2.

The improved filter is designed for use with filter material of infusorial earth, prepared, for example, as described in Letters Patent No. 665,925, dated January 15, 1901, and is so constructed as to provide for a variation of pressure on the inlet side of the filter, so as to maintain the pressure notwithstanding variations in flow of the beer to the filter, variations in the resistance of the filter as it becomes clogged and variations in flow at the discharge end of the apparatus; while provision is also made for the introduction under proper conditions and uniform distribution on the surface of the filter cores of loose filtering material which can be removed readily from time to time so that the clogging of the filter cores is retarded.

As shown in the drawings, the filter comprises a shell $b'$, fitted with removable heads or end plates $b^2$ and $b^3$, and provided with a fixed transverse wall $b^4$ which forms within the shell a receiving chamber $b^5$ and a discharge chamber $b^6$. The transverse wall $b^4$ is formed of impermeable material and supports the filter cores $c$, one of which is shown in detail in Fig. 3. As there shown it comprises a filter tube $c'$, formed of infusorial earth and closed at one end, while the other end is tightly secured to a head $c^2$ provided with a hollow stem $c^3$ which is passed through the wall or plate $b^4$, receiving on the discharge side of the plate, a nut $c^4$ by which the core is held tightly in place, suitable packing, not necessary to be shown, being provided to make a tight joint. The beer is delivered to the filter through a pipe $a^3$ from a pump $a^4$ or any other suitable source of supply under pressure, and first passes through the regulator $d$ hereinafter described and thence, by a pipe $e$, $e'$, to the receiving chamber $b^5$ of the filter. Under suitable pressure the beer is forced through the walls of the filter cores $c$ into the interior thereof and thence through the hollow stems $c^3$ into the discharge chamber $b^6$. From the latter it passes through a pipe $e^2$, thence through a regulator $l$, also described hereinafter, and thence through a pipe $e^3$, preferably provided with a stop cock $e^4$ and a sight glass $e^5$ to the bottling machine or elsewhere as may be desired.

The accomplishment of filtration to sterility is possible only when there is no imperfection in any of the cores and no leakage around the stems of the cores or through or around the plate $b^4$, from the chamber $b^5$ to the chamber $b^6$. It is therefore essential that it shall be possible to inspect the discharge side of the plate $b^4$ and the outlets of the cores while the inlet chamber $b^5$ is under pressure. Accordingly, the cores are mounted on a fixed plate and the cover $b^2$ is removable with respect thereto. Access being thus had the outlets of all the cores may be plugged to test the plate and joints around the stems and thereafter the plugs may be removed separately to test the flow of each individual core.

In order to prevent the disruption of the gas which is in solution in the beer before it passes through the filter, it is necessary that a predetermined pressure, which may be varied somewhat according to conditions, shall be maintained on the discharge side of the filter. Such pressure might be provided by the counter pressure in the bottling machine, or by any other convenient means, but is preferably maintained by the regulator $l$, hereinafter described, and in order that the pressure on the inlet side of the filter may be varied as the resistance of the filter varies, either with an increased or a decreased flow of beer through the filter, or with the clogging of the interstices of the filter, so that the necessary pressure on the discharge may be maintained, the inflow of beer to the filter is regulated by the regulator $d$, the action of which is controlled by the pressure on the discharge. The construction of a regulator, suitable for the purpose, is shown in detail in Figs. 4, 5 and 6. As there shown, the regulator comprises a shell $d'$, provided with an inlet $d^2$ to which the pipe $a^3$ may be connected, and an outlet $d^3$ to which the pipe $e$ may be connected. The outlet $d^3$ has an inward extension $d^4$ provided with a centrally disposed, downwardly opening mouth or valve seat $d^5$. Upper and lower caps $d^6$ and $d^7$ are secured to the shell $d'$ and serve to hold in place diaphragms $d^8$ and $d^9$. To the cap $d^7$ is secured a spring casing $d^{10}$ in which is placed a spring $d^{11}$ which acts upon a plunger $d^{12}$. The latter is secured to a yoke $d^{13}$, to which both diaphragms $d^8$ and $d^9$ are secured, and at its upper end the yoke $d^{13}$ has a plunger $d^{14}$ which is acted upon by a spring $d^{15}$ in a spring casing $d^{16}$ secured to the upper cap $d^6$. An adjusting screw $d^{17}$, threaded into the upper end of the spring casing $d^{16}$, serves to adjust the pressure of the spring $d^{15}$ downwardly against the diaphragm $d^8$ and, through the yoke $d^{13}$, against the diaphragm $d^9$. A branch pipe $e^6$, connected to the discharge pipe $e^2$, is also connected to the spring casing $d^{10}$ so that the pressure on the discharge of the filter may act against the underside of the diaphragm $d^9$. The yoke $d^{13}$ carries a valve plug $d^{18}$ which coöperates with the valve $d^5$ of the outlet extension $d^4$. It will now be seen that the pressure of the spring $d^{11}$ and the fluid pressure exerted against the underside of the diaphragm $d^9$ act to hold the valve plug $d^{18}$ against its seat so as to prevent the inflow of beer into the regulator and thence to the filter, and that by compressing the spring $d^{15}$ more or less, a force is exerted through the yoke $d^{13}$ to move the valve plug $d^{18}$ from its seat, while the pressure of the beer within the central chamber of the regulator, acting equally upon the diaphragms in opposite directions, has no tendency to open the valve. The pressure, therefore, at which the valve opens to permit the flow of beer to the filter, is determined by the adjusted pressure of the spring $d^{15}$, and the pressure on the inlet side of the filter will be increased as resistance of the filter increases, for if the pressure on the discharge, through increase of resistance in the filter, falls slightly, the valve will be opened wider by the pressure of the spring $d^{15}$. In this manner the pressure on the discharge will be maintained notwithstanding any increase in the resistance of the filter. A vent cock $d^{19}$ may be applied to the cap $d^7$ to permit any liquid which may enter or be condensed within the chamber above the cap to be drawn off from time to time. Obviously the inlet and the outlet of the regulator might be reversed without change in the mode of operation.

As the flow of beer at the bottling or filling machine or elsewhere may vary, it is desirable to provide means to prevent the reduction of pressure on the discharge side of the filter whenever the flow from the pipe $e^8$ tends to exceed the maximum capacity of the apparatus. For this purpose the regulator $l$ is inserted between the pipes $e^2$ and $e^8$. The construction of the regulator $l$ is substantially the same as that of the regulator $d$, as clearly shown in Fig. 7, except that the relative position of the parts is reversed, so that when the pressure of the beer in the pipe $e^2$ tends to fall slightly, the valve of the regulator $l$ will be closed partly so that the pressure will be maintained substantially. As shown in Fig. 7, the regulator $l$ comprises a shell $l'$ provided with an inlet $l^2$ to which the pipe $e^2$ may be connected and an outlet $l^3$ to which the pipe $e^8$ may be connected. The inlet $l^2$ has an inward extension $l^4$ provided with a centrally disposed upwardly opening mouth or valve seat $l^5$. Upper and lower caps $l^6$ and $l^7$ are secured to the shell $l'$ and serve to hold in place diaphragms $l^8$ and $l^9$. To the cap $l^7$ is secured a spring casing $l^{10}$ in which is placed a spring $l^{11}$ which acts upon a plunger $l^{12}$. The latter is secured to a yoke $l^{13}$ to which both diaphragms $l^8$ and $l^9$ are secured, and at its upper end the yoke $l^{13}$ has a plunger $l^{14}$ which is acted upon by a spring $l^{15}$ in a spring casing $l^{16}$ secured to the upper cap $l^6$. An adjusting screw $l^{17}$, threaded in the upper end of the spring casing $l^{16}$, serves to adjust the pressure of the spring $l^{15}$ downwardly against the diaphragm $l^8$, and, through the yoke $l^{13}$, against the diaphragm $l^9$. A branch pipe $e^7$, connected to the main discharge pipe $e^2$, is also connected to the spring casing $l^{10}$, so that the pressure on the discharge of the filter may act against the underside of the diaphragm $l^9$. The yoke $l^{12}$ carries a valve plug $l^{18}$ which coöperates with the valve seat $l^5$ of the extension $l^4$. It will now be seen that the pressure of the spring $l^{11}$ and the fluid pressure exerted against the underside of the diaphragm $l^9$ act to hold the valve plug $l^{18}$ away from its seat, against the pressure of the spring $l^{15}$, so as to permit the flow of beer through the regulator away from the filter, and that by compressing the spring $l^{15}$ more or less, a force is exerted through the yoke $l^{13}$ to move the valve plug $l^{18}$ toward its seat, while the pressure of the beer within the central chamber of the regulator, acting equally upon the diaphragms in opposite directions, has no tendency to close the valve. The pressure, therefore, at which the valve closes to prevent the flow of beer from the filter is determined by the adjusted pressure of the spring $l^{15}$ and any tendency of pressure in the pipes $e^2$ and $e^6$ against the diaphragm $l^9$ to fall will permit the valve plug $l^{18}$ to be pressed toward its seat by the spring $l^{15}$. In this manner the pressure on the discharge side of the filter will be maintained, notwithstanding any flow from the pipe $e^3$ in excess of the capacity of the apparatus. A vent cock $l^{19}$ may be applied to the cap $l^7$ to permit any liquid which may enter or be condensed in the chamber above the cap to be drawn off from time to time. A sight glass $h$ provided with a vent cock $h'$, a pressure gage $h^2$ and a shut-off cock $h^3$, is connected to the highest point of the supply or receiving chamber $b^5$ of the filter, as shown clearly in Fig. 2, and a sight glass $i$, provided with a vent cock $i'$, a pressure gage $i^2$ and a shut-off cock $i^3$, is connected to the highest point of the discharge chamber $b^6$, as also shown in said figure. A source of gas under pressure, as indicated by a pipe $k$ and a pressure reducing valve $k'$, may be connected to either or both of the chambers $b^5$ and $b^6$ through the shut-off cocks $h^3$ and $i^3$. A cock $a^5$ is preferably provided in the pipe $a^3$.

It is desirable, as indicated hereinbefore, to provide for the introduction into the filter of a quantity of loose filter material to be deposited uniformly on the surfaces of the filter cores $c$, so that such loose filter material will collect and hold the greater part of the substances which are to be filtered out of the beer and may be removed from time to time by simply washing out the filter, thereby permitting the cores to be used for a much longer time without becoming clogged to such an extent as to require removal and cleaning. The devices provided for the introduction of such loose filter material are shown in Figs. 1, 2, 8 and 9, and comprise a mixing vessel $m$, in which the loose filter material may be mixed with a portion of the beer under suitable conditions, particularly without loss of gas in the beer with which the filter material is mixed, with connections by which the mixture of beer and loose filter material may be discharged into the flow of beer toward the filter, so that the loose filter material will be distributed uniformly over the surfaces of the filter cores. Any suitable form of mixer may be employed for the purpose. As shown in Figs. 8 and 9 it consists of a cylindrical vessel in which is mounted a shaft $m'$ provided with arms or paddles $m^2$ and with a handle $m^3$ by which the loose filter material, which is introduced through a capped opening $m^4$, may be mixed with beer which is admitted to the vessel $m$ and thereafter forced into the filter. The vessel $m$ is preferably provided with a sight glass $m^5$ and is connected at its bottom by a pipe $m^6$ with the pipe $e$, $e'$ through which the beer flows into the filter, the pipe $m^6$ preferably having a sight glass $m^7$ and a stop cock $m^8$. At its top the vessel $m$ is connected by a pipe $m^9$ with a source of supply of gas under pressure, being conveniently connected for this purpose to the pipe $k$. After the filter chamber $b^5$ has been filled with beer, the stop cock $m^8$ is opened to permit the vessel $m$ also to be filled with beer, the pet cock $m^{10}$ being opened to permit the escape of the displaced gas under pressure. The loose filter material, which may be loose infusorial earth, having been previously introduced into the vessel $m$, is agitated with the beer until a uniform mixture is obtained. Gas under pressure above that on the beer in the chamber $b^5$ is then admitted to the vessel $m$ by manipulation of the regulator $k'$ and the cock $m^8$ is opened so that the mixture of beer and filter material is discharged slowly from the vessel $m$ into the filter chamber $b^5$ through the pipes $m^6$ and $e'$. As the operation of filtering is being carried on at this time and the beer is flowing constantly into the inlet chamber $b^5$, the loose filter material thus mixed with the beer is also carried slowly into the inlet chamber $b^5$ and is deposited uniformly on the surface of the filter cores. When the resistance of the filter increases unduly, the operation of the filter may be discontinued, the head $b^3$ removed and the loose filter material, with the collected substances, washed from the filter cores with a hose. The process of filtration may then be resumed and fresh filter material added as before.

It will be understood that the shape and size of the filter and its several parts, as well as the details of construction and arrangement may be varied to suit different conditions of use and that the invention, therefore, is not restricted to the precise construction and arrangement shown and described herein.

I claim as my invention:

1. The combination with a filter, of a regulator to regulate the admission of liquid to the filter, a connection from the regulator to the inlet side of the filter and a connection between the discharge side of the filter and the regulator whereby the pressure differential between the inlet side and the discharge side of the filter is varied as the resistance of the filter varies.

2. The combination with a filter, of a regulator comprising a chamber having connected thereto the liquid inlet and the inlet side of the filter, a diaphragm subject to the pressure on the discharge side of the filter, and a valve controlled by the diaphragm to regulate the pressure on the liquid delivered to the inlet side of the filter.

3. The combination of a filter comprising a casing, a transverse filter wall, an inlet chamber and a discharge chamber, a regulator comprising a casing with an inlet connection and a connection to the inlet chamber of the filter, a valve to control the pressure of the liquid admitted to the inlet chamber of the filter and a diaphragm to control said valve, and a connection from the discharge chamber of the filter to the diaphragm chamber.

4. The combination with a filter, of a regulator to regulate the escape of liquid from the filter, a connection from the discharge side of the filter to the regulator, a valve to control the flow of beer through the regulator and means acted upon by the pressure of the discharge from the filter to close the valve as the pressure tends to fall.

5. The combination with a filter, of a regulator, comprising a chamber having a connection therefrom to the discharge side of the filter and a connection therefrom to the discharge pipe, a diaphragm subject to the pressure on the discharge side of the filter, and a valve controlled by the diaphragm to regulate the flow of liquid through the regulator.

This specification signed and witnessed this 18th day of March, A. D., 1911.

EDWARD ZAHM.

Signed in the presence of—
HENRY NEU,
FRED M. HANDWERK.